United States Patent Office 3,525,618
Patented Aug. 25, 1970

3,525,618
DIAZOTYPE FILM MATERIALS

Max Keller, Riehen, and Theodor Haefeli, Fribourg, Switzerland, assignors to J. R. Geigy A.G., Basel, Switzerland No Drawing. Filed Nov. 29, 1965, Ser. No. 510,369
The portion of the term of the patent subsequent to Jan. 23, 1985, has been disclaimed
Int. Cl. G03c *1/60, 1/92*
U.S. Cl. 96—75 12 Claims

ABSTRACT OF THE DISCLOSURE

Diazotype film materials consisting of a transparent to opaque carrier coated with a composition containing uncolored hydrophilic binder, light sensitive aryl diazonium compound and noncoloring UV light absorber which retains its UV absorption during and after exposure of the carrier. These materials are useful in diazotype copying processes.

The present invention concerns film materials suitable for diazotype copying processes, processes for the production thereof, as well as photoprints produced on using these materials. In particular, it concerns diazotype copy films and diazotype film copies having improved properties and processes for the production thereof.

The use of paper, cellulose and cellulose acetate films having layers of light sensitive aryl diazonium compounds for the production of direct copies according to the so-called diazotype process is known. The diazotype process is very useful for the copying of line drawings and printed matter on transparent originals. The diazotype copying material covered by the transparent original is exposed to a strong radiation of actinic light. The light sensitive diazonium compound which is not covered by the lines and the print is thus photochemically decomposed. A colored positive copy of the original is formed by the coupling of the undecomposed aryl diazonium compound with phenolic coupling components. Due to the very high contrast of light sensitive diazotype layers, however, this process is not suitable for the reproduction of half tone originals, particularly not for the reproduction of photographic images as well as ciné films.

To reduce the high contrast of diazotype copying material, the filtering out of the radiation range of maximum absorption of the light sensitive diazonium compound on exposure has been suggested. As this makes the process extraordinarily more complicated, this suggestion has not become of any technical importance. Further development of this idea led to the suggestion to reduce in the diazotype layer itself the most photochemically active light from the chosen source by incorporating into this layer substances having a selective light absorption in the region of the maximal light sensitivity of the aryl diazonium compound. Suggested organic substances having light absorption in the critical range of 3500 to 3900 A. are, e.g., nitroaniline sulphonic acid, sulphonic acids of acridone, fluorenone, pyrene, perylene, anthracene as well as croconic acid. These additives should only retain their absorption power during exposure and should be considerably less light sensitive than the aryl diazonium compound. If possibile, they should be water soluble. The light sensitive diazotype layer was applied to the carrier such as paper or foils and films made of regenerated cellulose, by soaking it with an aqueous or aqueous-alcoholic solution of the aryl diazonium compound, the additives mentioned as well as, optionally, the coupling component and acid stabilizers which prevent premature coupling, and drying. The diazotype material so obtained has bad properties in use which are particularly disadvantageous for films.

In our patent application Ser. No. 369,104, filed May 21, 1964, a process for the production of improved and more serviceable diazotype copy films is described which consists in saponifying the surface of a cellulose acetate carrier film and treating it with a non-coloring, green-blue, blue to violet fluorescent optical brightener which is substantive to cellulose hydrate and, preferably, is of anionic character, and with a light sensitive aryl diazonium compound. The treatment can be performed in steps in the order given but rational performance of the process necessitates as few steps as possible. In practice, this process is performed by passing the cellulose acetate film through an over 50° C. hot dilute caustic alkaline aqueous solution of an anionic optical brightener, rinsing it, then treating one side of it with a solution of the light sensitive aryl diazonium compound and afterwards drying it. An anionic, preferably polysulphonated optical brightener having very good water solubility and which is very substantive to cellulose hydrate and which also must be very stable to alkali, is necessary for this method. These conditions limit the choice of optical brighteners to a considerable degree. Even when the tanning effect of the highly substantive and polysulphonated optical brightener applied to the cellulose hydrate increases the adsorption of the aryl diazonium compound, a two-step process is unavoidable. Another disadvantage which is particularly important in the technical evaluation of the process is that, under the relatively strong conditions of the saponification of the surface, the dimensional stability of the films used suffers, so that shrunk copies subsequently have to be cut into shape which is extremely undesirable. Also, diazotype copies have a tendency to gradually change color.

In the attempts to remove these disadvantages, it has now been found that diazotype copies which reproduce half tones and, particularly, diazotype film copies having good stability of form and in use, are obtained if the saponification of the surface of the carrier film is replaced by a coating.

Thus the present invention concerns a process for the production of diazotype film materials characterized by coating the surface of the transparent or opaque carrier with a composition of matter which contains uncolored hydrophilic binder, light sensitive aryl diazonium compound, non-coloring ultra violet light absorber which substantially retains its ultraviolet absorption during and after exposure of the carrier and, optionally, further substances which promote coating or influence or make possible the dyestuff formation.

The main carriers in this process are flexible films consisting of an uncolored, transparent polymeric and relatively hydrophobic synthetic plastic which are coated with a coating composition. This composition consists of an uncolored, preferably film-forming binder which is more hydrophilic than the carrier material, light sensitive aryl diazonium compound, non-coloring ultraviolet light (UV) absorbing light filtering agent which substantially retains its UV absorption during and after exposure of the film and, optionally, further substances which promote coating or influence or make possible the dyestuff formation. In a preferred embodiment of the invention, the carrier film consists of a transparent, polymeric, hydrophobic polyester, particularly a highly acylated cellulose ester, and the binder in the coating composition consists of a lower acylated cellulose ester which is more hydrophilic than the carrier material; it consists, in particular, of a lower acetylated cellulose acetate. The carrier is coated advantageously by applying a solution of the binder and the other components in a volatile, inert organic or organic-aqueous, particularly alcoholic-aqueous solvent. In addition to the binder and the light-sensitive aryl diazonium compound, this solution also contains as ultraviolet light-absorbing, non-coloring stable, light-filtering substance either green-blue, blue to violet fluorescent optical brighteners which are used in the textile and plastics industries or non-fluorescent UV absorbers for polymeric synthetic plastics, optionally also so-called plasticisers which promote film formation, as well as phenolic coupling components and stabilisers which prevent premature coupling, e.g. oxalic acid, tartaric acid or boric acid to prevent a coupling taking place in an alkaline medium. It is often advantageous for the coating to contain both blue to violet fluorescent optical brighteners, the presence of which is of advantage for the clarity of the non-image area, as well as non-coloring, non-fluorescent UV absorbers, the presence of which counteracts the yellowing on use and the ageing of the diazotype copies.

Examples of blue to violet fluorescent optical brighteners usual in the textile or plastics industries are the known or similar products from the classes of 4,4'-bis-(triazinylamino)stilbene sulphonic or carboxylic acids, as well as derivatives thereof such as optionally N-substituted sulphonic acid or carboxylic acid amides, sulfones, carboxylic acid esters and nitriles; from the classes of 4,4'-bis-(aroylamino-stilbene sulphonic or carboxylic acids including derivatives thereof, or α,β-bis-(benzazolyl)-alkenes, of 2,5-bis-(benzazolyl)-thiophenes and -furanes, of derivatives of 7-aminocoumarins, 3-aryl coumarins, from the classes of 1,4-bis-(styryl)-benzenes, 2,5-bis-(styryl) - 1,3,4 - oxdiazoles and -oxathiadiazole, 4-azolyl- and 4-arenoazolyl-stilbenes, from the classes of oxacyanines, 1,3-diphenyl pyrazolines, naphthalic acid imides, aminopyrazine carboxylic acid derivatives.

Particularly effective fluorescent optical brighteners suitable for use in the diazotype films according to the invention are (I) Triazolyl derivatives of the formula

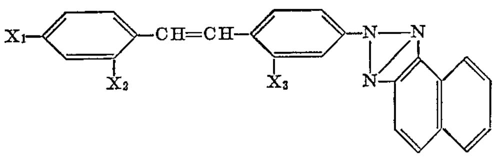

wherein each of $X_1$ and $X_2$ represents hydrogen, cyano or halogen, especially chlorine or bromine, $X_3$ represents halogen, cyano, $$-SO_3Z, \text{ or } -SO_2N\begin{matrix}R_1\\R_2\end{matrix}$$

Z being hydrogen or a monovalent cation, preferably an alkali metal ion or ammonium ion, and each of $R_1$ and $R_2$ representing hydrogen or lower alkyl;

(II) Pyrazoline derivatives of the formula

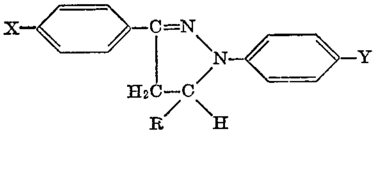

wherein

X represents hydrogen, or halogen, preferably chlorine or bromine,

R represents hydrogen or phenyl,

Y represents $-SO_3Z$ wherein Z has the same meaning as above, sulfamyl, lower alkyl-sulfonyl, $ZSO_3$-substituted lower alkyl-sulfonyl wherein Z has the above-given meaning, $ZOSO_3$-lower alkyl-sulfonyl, wherein Z has the above-given meaning, —COOZ wherein Z has the meaning given above, or lower alkoxy-carbonyl;

(III) Bis-triazinylaminostilbene derivatives of the formula

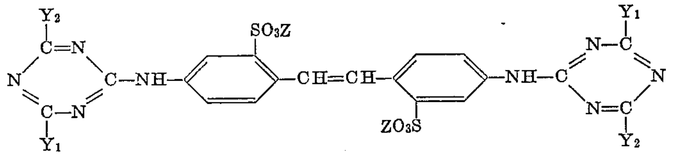

wherein $Y_1$ represents phenylamino, $ZSO_3$-substituted phenylamino, chlorine, lower alkoxy and hydroxy-lower alkoxy, especially β-hydroxy-ethoxy, and $Y_2$ represents lower alkoxy especially methoxy or ethoxy, lower alkyl-substituted amino, hydroxy-lower alkyl-substituted amino, especially N-methyl-N-(β - hydroxyethyl)-amino, β - hydroxyethyl-amino, β - hydroxypropyl-amino, N,N - bis-(β-hydroxyethyl)-amino, or N,N - bis - (β-hydroxypropyl)-amino, lower alkoxy-lower alkyl-substituted amino, especially β-methoxyethyl-amino or γ - methoxypropyl-amino, hydroxy-lower alkoxy-lower alkylamino, especially 2 - (β-hydroxyethoxy)-ethyl amino, or morpholino or lower alkyl-substituted morpholino;

(IV) 3-phenyl coumarin derivatives of the formula

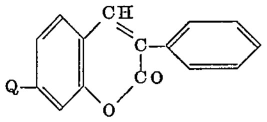

wherein Q represents lower alkoxy-carbonyl-amino, pyrazolyl- (1) and lower alkyl-pyrazolyl-(1), naphthotriazolyl-(2), or a radical of the formula

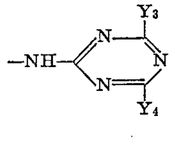

wherein $Y_3$ represents chlorine, bromine or amino, and $Y_4$ represents lower alkyl-substituted amino, preferably dimethylamino and diethylamino, and (V) Benzoxazole derivatives of the formula

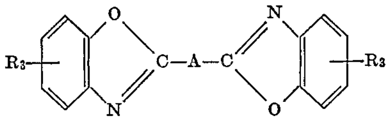

wherein $R_3$ represents hydrogen or lower alkyl, and

A represents one of the radicals

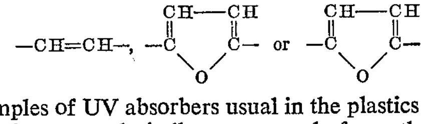

Examples of UV absorbers usual in the plastics industry are the known and similar compounds from the classes of 2-hydroxyphenyl benzotriazoles, 2 - hydroxyphenyl phenyl ketones, 2-hydroxyphenyl triazines, 2-hydroxyxanthones and β,β-diphenyl-α-cyanoacrylic acid derivatives.

Such non-colouring, light stable UV absorbers corresponds for example, to the Formula I

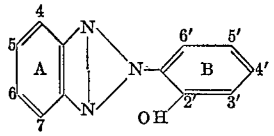

(I)

In this formula, the ring A can be substituted, e.g. by chlorine, low alkyl, alkoxy, alkylsulphonyl groups, carboxylic acid ester and amide groups, sulphonic acid ester and amide groups as well as by acylamino groups; the ring B can be substituted, e.g., by chlorine, low alkyl, alkoxy, acylaminomethyl, acylamino groups, cycloalkyl and phenyl groups as well as, in the 5′-position, by carboxylic acid ester groups.

Another class of non-colouring, light stable UV absorbers corresponds to Formula II

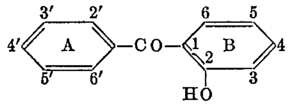

(II)

In this formula, the ring A can be substituted by chlorine, low alkyl and alkoxy groups, aryloxy groups as well as, in the 2′- and/or 4-position, by hydroxyl groups; the ring B can be substituted by chlorine, low alkyl groups, in the 4-position by alkoxy groups or the hydroxyl group and, in the 3- or 5-position, by a benzoyl group.

A third class of light stable, non-colouring UV absorbers corresponds to Formula III

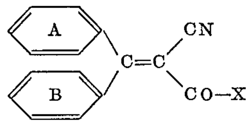

(III)

In this formula X represents an optionally substituted alkoxy, alkylamino or dialkylamino group and the benzene rings A and B can be substituted, e.g. by chlorine, low alkyl and alkoxy groups.

A fourth class of non-colouring, UV absorbers corresponds to Formula IV

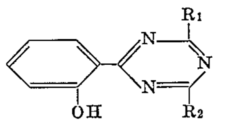

(IV)

In this formula $R_1$ represents an optionally substituted alkyl, phenyl and 2-hydroxyphenyl group; $R_2$ represents the same as $R_1$ with the condition that when $R_1$ is o-hydroxyphenyl, $R_2$ can also be an optionally substituted alkoxy, alkylthio and alkylamino group; the benzene rings can optionally be substituted by chlorine, low alkyl and alkoxy groups as well as by a second hydroxyl group in the m-position to the first hydroxyl group.

A further class of light stable, non-colouring UV absorbers corresponds to Formula V

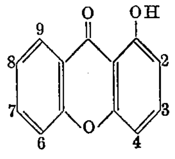

(V)

In this formula, chlorine and alkyl groups can be substituents in the 2- to 9-positions and alkoxy and hydroxyl groups can be substituents in the 3-, 7- and 9-positions.

Another class of light stable, non-coloring UV absorbers corresponds to Formula VI

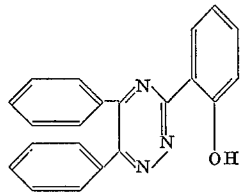

(VI)

wherein the phenyl rings can be substituted by chlorine, alkyl and alkoxy groups.

As the affinity of all these UV absorbers to the carrier or binder only plays a subsidiary part, there are many possibilities from which a composition of matter suitable for an individual case can be chosen. Nevertheless, it should be noted that fluorescent UV absorbers which have affinity to one of the carrier or binder materials are particularly suitable.

A few examples are given below of carrier materials usable in the present invention together with the binders suitable for use therewith in the coating, to which examples, however, the invention is not limited:

(a) Cellulose ester films or foils such as cellulose triacetate, cellulose-2½-acetate, cellulose mixed esters such as cellulose acetobutyrate and films and foils made from mixtures of these esters, together with cellulose diacetate, low nitrated alcohol-soluble nitrocellulose, low acylated cellulose acetobutyrate, cellulose methyl or ethyl ether, or with mixtures of these substances as binder in the coating;

(b) Films and foils made from polystyrene, together with alcohol-soluble nitrocellulose, cellulose alkyl ethers or low polymeric acrylic acid esters as binder in the coating;

(c) Films, foils and sheets made from polyester, particularly polyesters of dibasic aromatic carboxylic acids with divalent alcohols such as terephthalic acid polyglycol ester, together with low polymeric acrylic acid esters as binder in the coating;

(d) Films, foils and sheets made from polyamide, particularly polyamide from polybasic aliphatic carboxylic acids and aliphatic or cycloaliphatic polyamines such as amides of adipic acid, sebacic acid with, e.g. hexamethylenediamine, decamethylenediamine ("nylon" types), together with alcohol-soluble nitro-cellulose, low polymeric acrylic acid esters or low molecular polyamide as binder in the coating;

(e) Films, foils and sheets made from polyolefinic acid esters such as polyacrylic acid and polymethacrylic acid esters, from polyvinyl esters such as polyvinyl acetate, together with low polymeric polyacrylic acid esters, alcohol-soluble nitro-cellulose or cellulose ethers as binder in the coating;

(f) Films and foils made from cured polyvinyl alcohol, together with uncured polyvinyl alcohol, polyvinyl acetate or low polymeric acrylic acid esters as binder in the coating;

(g) Films and foils made from polyvinyl chloride, together with low molecular polyvinyl chloride or polyvinyl chloride-acrylic acid ester (mixed) co-polymers as binder in the coating;

(h) Films and foils made from regenerated cellulose (cellophane types), together with alcohol-soluble (low nitrated) nitrocellulose, low polymeric acrylic acid esters or polyvinyl esters as binder in the coating; films and foils made from polyformaldehyde, together with hydrophilic cellulose esters and cellulose ethers or low polymeric acrylic acid esters as binder in the coating;

(i) Glass as carrier, together with unsaturated polyester resins, cellulose ethers, low polymeric acrylic acid esters, cellulose esters, etc. as binder in the coating; unsized or sized paper as carrier together with cellulose acetate of low degree of acylation, cellulose ethers, etc. as binder in the coating.

However, other natural or synthetic binders forming hydrophilic colloids can also be used.

As has already been mentioned above, it is of advantage if the coating or the binder in the coating has more hydrophilic properties than the carrier. Often the hydrophilic properties of the coating can be further improved by incorporating substances which retain moisture or promote affinity to water into the composition of matter used, for example ether alcohols such as diethylene glycol, dihydroxyethyl and dihydroxypropyl sulphide, acid amides such as urea and methylol ureas, esters or partial esters of polyvalent alcohols, e.g. glycerin di- and tri- acetate (Triacetin). If the coating is too hydrophobic to facilitate dyestuff formation with the aqueous-alkaline coupling solution, then a content of hydrophilic organic solvents such as low alkanols, ether alcohols, low ketones or mixtures of such solvents in this coupling solution can often be suitable, but any adverse influence on the coating or the carrier must be considered. It is favourable if the binder in the coating has film-forming properties. To promote film-formation and maintain the elastic properties of the coating, it is often advantageous also to add plasticizers usual in the lacquer industry to the coating composition, e.g. phthalic acid dialkyl esters, phosphoric acid alkyl and phenol esters, adipic and sebacic acid dialkyl esters and mixtures of esters produced from mixtures of mono- and poly-valent carboxylic acids and mono- and poly-valent alcohols.

As light sensitive aryl diazonium compounds, those usual in diazotype processes or similar compounds are used; particularly for black-white copies p-aminoaryl diazonium compounds are used such as p-alkylbenzene, p-aralkylbenzene, p-diaralkylbenzene, p-dialkylbenzene, p-arylbenzene, p-alkylarylbenzene or p-alkylaralkylbenzene as well as p-aroylaminobenzene diazonium salts, particularly those containing ether groups, e.g. the p-diethylaminobenzene, p-ethylaminobenzene, p-phenylaminobenzene, p-phenyloxethylaminobenzene, p-phenyl-o-methoxybenzene or p-phenyl-o-ethoxybenzene, 4-aroylamino-2,5-dimethoxybenzene or 4-aroylamino-2,5-diethoxybenzene diazonium salts, particularly halides of the diazonium compounds which may be stabilised with zinc chloride and similar metal halides.

The coupling components which are used are those which easily couple in an alkaline medium, particularly the phenolic coupling components which easily couple such as resorcinol, phloroglucin, tetrahydroresorcinols, also 2,4-dihydroxyquinolines, benzotetronic acid, dihydroxynaphthalenes, pyrazolones and mixtures of such coupling components.

The dyestuff is developed in or on the exposed diazotype material in the usual way by a wet treatment with an alkaline, aqueous coupling solution; it can also be developed with so-called dry developing material which also contains the phenolic coupling component and the acids, such as tartaric or boric acid which prevent premature coupling, in the coating by treating the exposed material with vapours of volatile bases such as ammonia.

The content of light sensitive aryl diazonium compound in the film materials coated according to the invention is that usual in diazotype processes and the content of UV-absorbing, fluorescent or non-fluorescent substance depends on the intensity of the UV absorption of these substances and on the requirements of an acceptable exposure time; the optimal ratios must be determined for each coating composition by series of tests.

The diazotype material obtained according to the invention and, particularly, the new diazotype copy films are distinguished by an acceptable lower gradation and the diazotype copies obtained therewith are outstanding in that all half tones are in good accordance with the original; the material is also distinguished by serviceability and ageing stability.

The following non-limitative examples illustrate the invention. Where not otherwise expressly stated, in the examples parts and percentages are given by weight. The temperatures are given in degrees centigrade.

EXAMPLE 1

A cellulose triacetate film is treated in a usual commercial coating machine on one side with a coating solution which consists of:

| | G. |
|---|---|
| Ethylene glycol monomethyl ether | 800 |
| Pure water | 100 |
| Cellulose diacetate (44% acetic acid content) | 50 |
| Dibutylphthalate plasticiser | 80 |
| Diazonium salt from p-aminodiphenylamine having no nitroso content | 15 |
| 2-(2′-hydroxyphenyl)-benzotriazole, the latter being dissolved in 100 g. of acetone | 5 |

The viscosity of the solution and the velocity of the coating machine are so adjusted that, after drying in a stream of 30° warm air, a layer of 10$\mu$ thickness is formed. Coating and drying are performed in yellow, UV-free light. Afterwards, the film is packed while excluding light. It is well suited for the copying of positive ciné films in one of the usual copying machines with a mercury vapour or xenone lamp.

After exposure, the film is continuously developed at 70° for 10 seconds in a solution made up with water to 1 liter containing

| | G. |
|---|---|
| Monobasic potassium phosphate | 20 |
| Sodium formate | 20 |
| Phloroglucin | 3 |
| Resorcinol | 1.2 |
| $\beta$-Naphthol, the latter having been previously dissolved in 10 ml. of ethanol, and | 0.75 |
| Sodium hydroxide 100% | 5 |

The film is then cold rinsed and dried. Positive copies of photographic originals are obtained therewith which have well defined half tones and a maximal black density of about 2.0.

Diazotype copy films having similarly good properties are obtained if, in the process described above, the corresponding amount of one of the following compounds is used as UV absorber.

2-(2′-hydroxy-5′-methylphenyl)-benzotriazole,
2-(2′-hydroxy-3′,5′-dimethylphenyl)-benzotriazole,
2-(2′-hydroxy-3′-methyl-5′-tert.butylphenyl)-benzotriazole,
2-(2′-hydroxy-3′-tert.butyl-5′-methylphenyl)-benzotriazole,
2-(2′-hydroxy-4′,5′-dimethylphenyl)-benzotriazole,
2-(2′-hydroxy-5′-methylphenyl)-5-methyl-benzotriazole,
2-(2′-hydroxy-3′,5′-dimethylphenyl)-5-methyl-benzotriazole,
2-(2′-hydroxy-3′-methyl-5′-tert.amylphenyl)-5-methyl-benzotriazole,
2-(2′-hydroxy-3′-tert.amyl-5′-methylphenyl)-5-methyl-benzotriazole,
2-(2′-hydroxy-4′,5′-dimethylphenyl)-5-methyl-benzotriazole,
2-(2′-hydroxy-5′-methylphenyl)-5-chloro-benzotriazole,
2-(2′-hydroxy-5′-methylphenyl)-5-fluoro-benzotriazole,
2-(2′-hydroxy-5′-methylphenyl)-5-trifluoromethyl-benzotriazole,
2-(2′-hydroxy-5′-methylphenyl)-5-sulphonic acid dimethylamide benzotriazole,
2-(2′-hydroxy-5′-methylphenyl)-5-methylsulphonyl-benzotriazole,
2-(2′-hydroxy-5′-methylphenyl)-5-benzoylamino-benzotriazole,
2-(2′-hydroxy-5′-methoxyphenyl)-benzotriazole,
2-(2′-hydroxy-5′-ethoxyphenyl)-benzotriazole,
2-(2′-hydroxy-4′-$\beta$-hydroxyethoxyphenyl)-benzotriazole,
2-(2′-hydroxy-5′-chlorophenyl)-benzotriazole, 2-(2'-hydroxy-5'-methylphenyl)-5-carboethoxy-benzotriazole, 2-(2'-hydroxy-5'-tert.butylphenyl)-5-methylsulphonyl-benzotriazole.

EXAMPLE 2

A cellulose-2½-acetate film is coated on one side in a coating machining as described in Example 1 with a solution of the following composition:

| | G. |
|---|---|
| Technical methyl acetate, 85% | 900 |
| Cellulose-2½-acetate (52% acetic acid content) | 50 |
| Di-2-methoxyethylphthalate | 50 |
| Diazonium salt from 3 - ethoxy - 4 - aminodiphenylamine | 15 |
| 1 - (4' - suphamidophenyl) - 3 - (4' - chlorophenyl)-$\Delta^2$-pyrazoline, as optical brightener the latter having been previously dissolved in 100 g. of methanol | 6 |

After drying, exposing and developing under the conditions described in Example 1, similarly good positive copies are obtained.

Instead of the blue fluorescent pyrazoline compound used above, also the same amount of one of the following optical brighteners can be used:

1-(4'-dimethylamidosulphonylphenyl)-3-phenyl-pyrazoline, 1-(4'-dimethylamidosulphonylphenyl)-3-(4'-chloro-phenyl-pyrazoline, 1-(4'-morpholinosulphonylphenyl)-3,5-diphenyl-pyrazoline, 1-(4'-carboxyphenyl)-3,5-diphenyl-pyrazoline, 1-(4-'-carbomethoxyphenyl)-3-(4'-chlorophenyl)-pyrazoline, 1-(4'-carboethoxyphenyl)-3-phenyl-pyrazoline, 1-(4'-sulphophenyl)-3-(4'-chlorophenyl)-5-phenyl-pyrazoline.

EXAMPLE 3

A cellulose triacetate film is treated in a coating machine on one side with a solution of the same composition as that in Example 1 but which also contains 10 g. of optical brightener of the formula

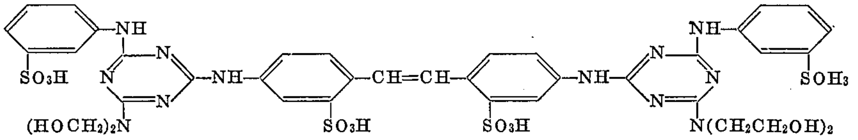

previously dissolved in 100 g. of methyl Cellosolve.

After drying, exposing and developing the coated film under the conditions given in Example 1, positive copies having well defined half tones and a maximal black density of 2.3 are obtained.

If the UV absorber and the brightener are omitted from the coating solution, then a lower maximal black density is obtained and on copying under a standard continuous tone grey wedge, less (half-tones) of the grey wedge are reproduced.

Diazotype copy films having similar properties are obtained if in the process of the above example, an optical brightener of similar constitution is used, for example, the corresponding 4-hydroxyethylamino-, 4-hydroxyethyl-methylamino-, 4-morpholino-, 4-ethoxy-, 4-hydroxyethoxy- and 4-$\beta$-hydroxypropylamino-6-(3'- or 4' - sulphophenyl-amino)-1,3,5-triazinyl-(2)-aminostilbene compounds, and if, as UV absorber, another of the 2-(2'-hydroxyphenyl)-benzotriazole compounds is used.

EXAMPLE 4

A barrier layer is first applied to a film made of cellulose-2½-acetate containing 52% saponifiable acetic acid (calculated on the weight of the cellulose acetate) as follows:

A coating solution is applied to the film in the coating machine, which solution contains 50 g. of cellulose-2½-acetate, 80 g. of di-2-methoxyethylphthalate as plasticiser and 1.5 g. of methyl silicone oil, as water repellent, per liter of ethylene glycol monomethyl ether, the coating being so applied that, after drying, a barrier layer of 5 to 10$\mu$ thickness is formed. A coating solution is then applied to the film so prepared in the coating machine, which solution consists of 700 g. of ethylene glycol monomethyl ether, 100 g. of pure water, 50 g. of cellulose diacetate containing 44% saponifiable acetic acid (calculated on the weight of the cellulose acetate), 80 g. of di-2-methoxy-ethyl phthalate as plasticizer, 15 g. of diazonium salt from 2,5-dimethoxy-4-aminodiphenylamine having no nitroso content, 5 g. of optical brightener 3,5-bis-ethylamino-pyrazine-2,6-dicarboxylic acid ethyl amide and 5 g. of the UV absorber 3-(2'-hydroxyphenyl)-5,6-diphenyl - 1,2,4-triazine.

After drying, exposing and developing the coated film under the conditions given in Example 1, positive copies are obtained which have well defined half tones. The barrier layer prevents the penetration of the diazonium compound into the cellulose acetate carrier and the yellowing of the image area originating therefrom. The diazonium compound penetrates much more easily into cellulose-2½-acetate than into cellulose triacetate.

If in the process described above, a carrier film made of cellulose triacetate is used, then similarly good diazotype copy films are obtained without applying a barrier layer. Equally good results are also attained if another 2-hydroxyphenyl triazine compound is used, e.g. 2-(2'-hydroxyphenyl) - 4,6 - diphenyl - 1,3,5 - triazine, 2 - (2'-hydroxyphenyl)-4,6-diethyl-1,3,5-triazine, 2 - (2'hydroxy-phenyl) - 4,6 - dibenzyl - 1,3,5 - triazine, 2-(2' - hydroxy-phenyl) - 4,6 - diethoxy - 1,3,5 - triazine, 2-(2'-hydroxy-phenyl)-4-octoxy- or -octylthio-1,3,5-triazine, and analogous compounds the aryl radicals of which are substituted by halogen, alkyl or alkoxy groups.

Instead of the optical brightener used above, a corresponding amount of one of the following compounds can be used with similar success: 3,5 - bis - ethylamino-pyrazine-2-carboxylic acid-ethylamide-6-carboxylic acid - 3'-sulphamoyl anilide, 3-phenyl-7-carboethoxyamino coumarin, 3-phenyl-7,(4'-chloro-6'-diethylamino-1',3',5' - triazinyl-(2')-amino)-coumarin, 3 - phenyl - 7 - (4' - methyl-6'-diethylamino-1',3',5'-triazinyl-(2')-amino) - coumarin, 3-phenyl-7-(4'-amino-6'-diethylamino - s - triazinyl-(2')-amino) - coumarin, 3-phenyl-7-(3' - methylpyrazolyl-(1')-coumarin, 3-phenyl-7-[4,5-naphtho-1,2,3-triazolyl - (2)]-coumarin, 4 - naphthotriazolyl - (2') - 2 - cyano - 4'-chlorostilbene, 4-naphthotriazolyl - (2') - stilbene - 2-sulphonic acid ethylamide, 4 - naphthotriazolyl-(2')-stilbene-2-sulphonic acid diethylamino ethylamide.

EXAMPLE 5

A cellulose triacetate film is treated in a coating machine on one side with a solution of the same composition as that in Example 1 but which in addition contains 10 g. of optical brightener of the formula

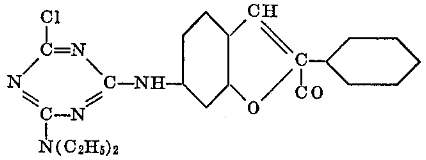

previously dissolved in 100 g. of methyl cellosolve.

After drying, exposing and developing the coated film under the conditions given in Example 1, positive copies having well defined half tones and a maximal black density of 2.3 are obtained.

If the UV absorber and the brightener are omitted from the coating solution, then a lower maximal black density is obtained and, on copying under a standard continuous tone grey wedge, 25 to 40% less steps on the grey scale are reproduced.

Diazotype copy films having similar properties are obtained if in the process of the above example, an optical brightener of similar constitution is used, for example, 7-[2-diethylamino-4-amino-1,3,5-triazinylamino - (6)] - 3-phenylcoumarin and if, as UV absorber, another of the 2-(2'-hydroxyphenyl)-benzotriazole compounds is used.

EXAMPLE 6

A coating solution is applied to one side of a polyester film consisting substantially of terephthalic acid ethylene glycol polyester. The coating solution is produced from

| | G. |
|---|---|
| Ethyl acetate | 400 |
| Ethylene glycol monomethyl ether | 300 |
| Lower polymeric acrylic acid butyl ester | 100 |
| Nitrocellulose (alcohol-soluble) | 100 |
| Di-ethyl phthalate as plasticiser | 50 |
| Diazonium compound from 4-amino-2-ethoxy-diphenylamine | 15 |
| Optical brightener of the formula | 5 |

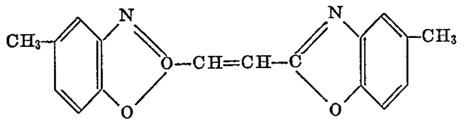

which brightener has been dissolved in 100 parts of ethylene glycol monomethyl ether.

After drying the coating in a 40° warm, dust-free air-stream, exposing the diazotype material so obtained under an original and developing as described in Example 1, good positive copies are obtained. The copies are on a film base which is extraordinarily resistant to tearing which is very suitable, mainly, for the reproduction technique.

If 5 g. of the UV absorber β,β-diphenyl-α-cyanoacrylic acid butyl ester are added to the coating solution of Example 6, then diazotype copy films are obtained which are protected against quick yellowing and are otherwise similar to those described above.

Diazotype material having similar properties are also obtained if, in the coating mass described above, with otherwise the same composition, the corresponding amount of one of the following compounds is used as optical brightener:

α,β-Bis-[5-ethoxybenzoxazolyl-(2)]-ethylene,
α,β-Bis-[benzimidazolyl-(2)]-ethylene,
α,β-Bis-[1-methylbenzimidazolyl-(2)]-ethylene,
α,β-Bis-[1-hydroxyethyl-benzimidazolyl-(2)]-ethylene,
α-[5-methylbenzoxazolyl-(2)]-β-[(1-hydroxyethyl)-benzimidazolyl-(2)]-ethylene,
2,5-bis-[5-methylbenzoxazolyl-(2)]-thiophene,
2,5-bis-[5-methoxybenzoxazolyl-(2)]-thiophene,
2,5-distyryl-1,3,4- oxdiazole or -thiadiazole,
1,4-distyryl-benzene,
4-ethoxy-1,8-naphthalic acid-N-hydroxyethylimide,
4-ethoxy-1,8-naphthalic acid-N-p-methylphenylimide,
4-methoxy-1,8-naphthalic acid-N-p-ethoxyphenylimide,
4-carboethoxyamino-1,8-naphthalic acid-N-β-hydroxy-propylimide,
4-acetylamino-1,8-naphthalic acid-N-phenylimide, and if, as UV absorber, the corresponding amount of:

β,β-Diphenyl-α-cyanoacrylic acid monoethanolamide,
β,β-Bis-p-toluyl-β-cyanoacrylic acid diethylamide,
2-hydroxybenzophenone, or
2-hydroxy-4-ethoxybenzophenone is used.

We claim:

1. A diazotype film material comprising
(1) a transparent to opaque film base and
(2) a coating on said film base which contains
(a) uncolored hydrophilic binder,
(b) light-stable UV absorbing light-filtering agent selected from the group consisting of
(i) triazolyl derivatives of the formula

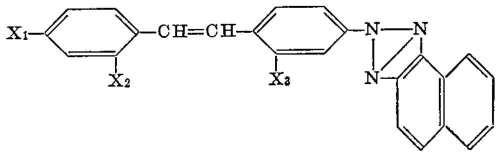

wherein each of
$X_1$ and $X_2$ represent hydrogen, cyano or halogen, and
$X_3$ represents halogen, cyano, $-SO_3Z$, or

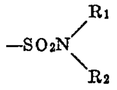

Z being hydrogen or a monovalent cation, and each of $R_1$ and $R_2$ representing hydrogen or lower alkyl,
(ii) pyrazoline derivatives of the formula

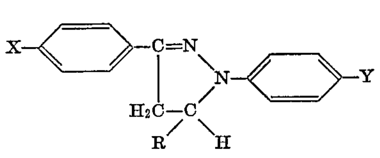

wherein
X represents hydrogen or halogen,
R represents hydrogen or phenyl, and
Y represents sulfamyl, lower alkyl-sulfonyl, lower alkoxy carbonyl, $-SO_3Z$, $ZSO_3$-substituted lower alkyl - sulfonyl, $ZOSO_3$-lower alkyl-sulfonyl or $-COOZ$, Z being hydrogen or a monovalent cation,
(iii) bis-triazinylaminostilbene derivatives of the formula

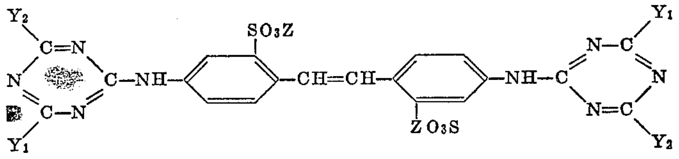

wherein $Y_1$ represents phenylamino, chlorine, lower alkoxy, hydroxy-lower alkoxy, $ZSO_3$-substituted phenylamino, Z being hydrogen or a monovalent cation, and $Y_2$ represents lower alkoxy, lower alkyl-substituted amino-hydroxy-lower alkyl-substituted amino, lower alkoxy-lower alkyl-substituted amino, hydroxy-lower alkoxy-lower alkylamino, morpholino or lower alkyl-substituted morpholino, (iv) 3-phenyl coumarin derivatives of the formula

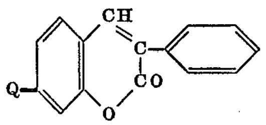

wherein Q represents lower alkoxy-carbonyl-amino, pyrazolyl-(1), lower alkyl-pyrazolyl-(1), naphthotriazolyl-(2), or a radical of the formula

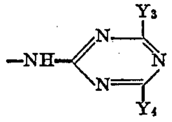

wherein $Y_3$ represents chlorine, bromine or amino, and $Y_4$ represents lower alkyl-substituted amino, and (v) benzoxazole derivatives of the formula

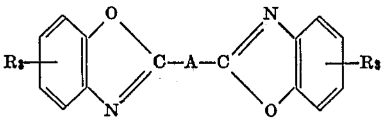

wherein $R_3$ represents hydrogen or lower alkyl, and

A represents one of the radicals

—CH=CH—

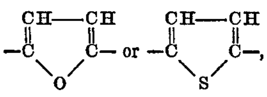

and (c) a cationic light-sensitive aryl diazonium compound suitable as diazotype developable component.

2. A diazotype film material as described in claim 1, wherein said film base consists substantially of highly acylated cellulose ester.

3. A diazotype film material as described in claim 1, wherein said coating contains as component (a) low-acylated cellulose ester.

4. A diazotype film material as in claim 1, wherein the light-stable UV absorbing light-filtering agent is a 3-phenyl coumarin derivative of the formula

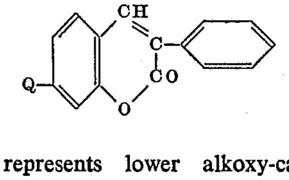

wherein Q represents lower alkoxy-carbonyl-amino, pyrazolyl-(1), lower alkyl-pyrazolyl-(1), naphthotriazolyl-(2), or a radical of the formula

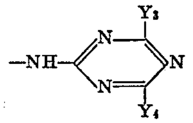

wherein $Y_3$ represents chlorine, bromine or amino, and $Y_4$ represents lower alkyl-substituted amino.

5. A diazotype film material as in claim 1, wherein the light-stable UV absorbing light-filtering agent is a benzoxazole derivative of the formula

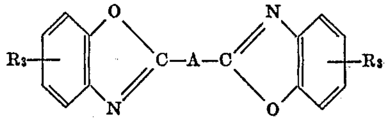

wherein $R_3$ represents hydrogen or lower alkyl, and

A represents one of the radicals —CH=CH—,

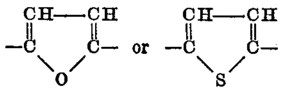

6. A diazotype film material as in claim 1, wherein the light stable UV absorbing light-filtering agent is 1-(4′-sulphamidophenyl)-3-(4′-chlorophenyl)-$\Delta^2$-pyrazoline.

7. A diazotype film material as in claim 1, wherein the light stable UV absorbing light-filtering agent is 1-(4′-carbomethoxyphenyl)-3-(4′-chlorophenyl)-pyrazoline.

8. A diazotype photographic positive copy film comprising (1) a film base consisting essentially of cellulose alkanoate, (2) a coating on a face of said film base, a major portion of said coating consisting of film-forming cellulose ester binder, said coating having a thickness of from about 5 to 10 microns and further containing, in fine dispersion in said binder, (a) a cationic light-sensitive aryl diazonium compound suitable as diazotype developable component, and (b) a light-stable UV absorbing light-filtering agent selected from the group consisting of (i) triazolyl derivatives of the formula

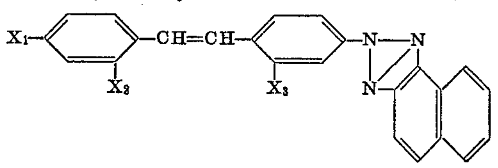

wherein each of $X_1$ and $X_2$ represents hydrogen, cyano or halogen, and $X_3$ represents halogen, cyano, $—SO_3Z$, or

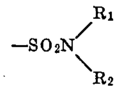

Z being hydrogen or a monovalent cation, and each of $R_1$ and $R_2$ representing hydrogen or lower alkyl, (ii) pyrazoline derivatives of the formula

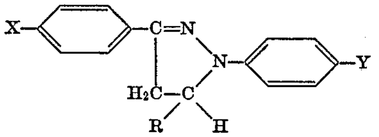

wherein

X represents hydrogen, or halogen,

R represents hydrogen or phenyl, and

Y represents sulfamyl, lower alkyl-sulfonyl, lower alkoxy carbonyl —$SO_3Z$, $ZSO_3$-substituted lower alkyl-sulfonyl, $ZOSO_3$ - lower alkyl - sulfonyl, or —COOZ, Z being hydrogen or a monovalent cation, (iii) bis-triazinylaminostilbene derivatives of the formula

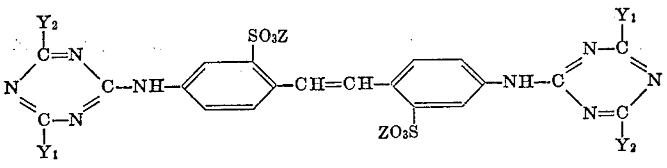

wherein $Y_1$ represents phenylamino, chlorine, lower alkoxy, hydroxy-lower alkoxy, $ZSO_3$-substituted phenylamino, Z being hydrogen or a monovalent cation, and $Y_2$ represents lower alkoxy, lower alkyl-substituted amino, hydroxy-lower alkyl-substituted amino, lower alkoxy-lower alkyl-substituted amino, hydroxy-lower alkoxy-lower alkylamino, morpholino or lower alkyl-substituted morholino, (iv) 3-phenylcoumarin derivatives of the formula

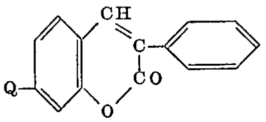

wherein Q represents lower alkoxy-carbonyl amino, pyrazolyl-(1), lower alkyl-pyrazolyl-(1), naphthothriazolyl-(2), or a radical of the formula

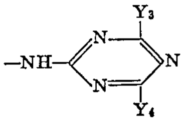

wherein $Y_3$ represents chlorine, bromine or amine, and $Y_4$ represents lower alkyl-substituted amino, and (v) benzoxazole derivatives of the formula

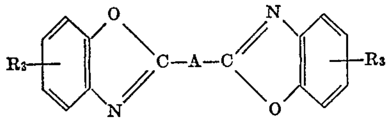

wherein $R_3$ represents hydrogen or lower alkyl, and

A represents one of the radicals —CH=CH—,

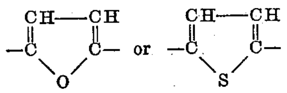

9. A diazotype photographic positive copy film as defined in claim 8, wherein component (a) is present in said coating in an amount ranging from about 0.02 to 0.2 gram per square meter, and component (b) is present in said coating in an amount ranging from about 0.2 to 3 grams per square meter, of film surface.

10. A diazotype photographic film as defined in claim 8, wherein the film base consists essentially of cellulose 2½-acetate.

11. A diazotype photographic film as defined in claim 8, wherein the film base consists essentially of a member selected from the group consisting of cellulose di-acetate, cellulose tri-acetate, cellulose 2½-acetate, cellulose propionate, cellulose butyrate, cellulose nitrate and mixed cellulose lower alkanoates.

12. A diazotype photographic film as defined in claim 8, wherein the weight ratio of said diazonium compound to said light filtering agent is in the range of about 1:10 to 1:15.

References Cited

UNITED STATES PATENTS

| | | | |
|---|---|---|---|
| 2,245,628 | 6/1941 | Von Poser et al. | 96—91 |
| 2,378,583 | 6/1945 | Schmidt | 96—91 |
| 3,166,422 | 1/1965 | McKinney et al. | 96—91 XR |
| 3,069,268 | 12/1962 | Herrick | 96—75 XR |

FOREIGN PATENTS

| | | |
|---|---|---|
| 38/12,084 | 7/1963 | Japan. |
| 39/10,164 | 6/1964 | Japan. |
| 643,042 | 9/1950 | Great Britain. |
| 6413561 | 5/1965 | Netherlands. |

NORMAN G. TORCHIN, Primary Examiner

C. BOWERS, Assistant Examiner

U.S. Cl. X.R.

96—49, 91